Nov. 21, 1961 W. SIMON 3,009,848
ELASTIC FOAM ARTICLE AND APPARATUS FOR MAKING SAME
Filed March 26, 1956 2 Sheets-Sheet 1
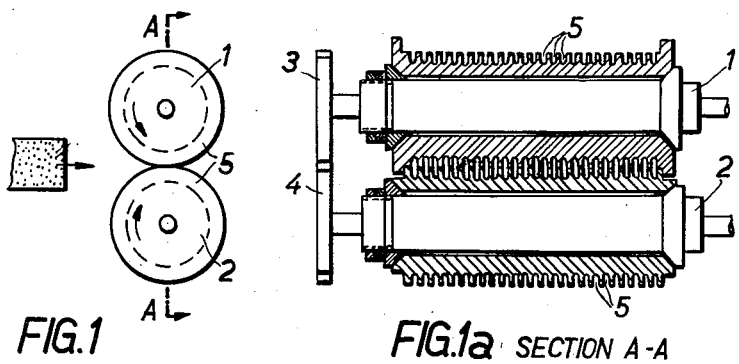
FIG.1  FIG.1a SECTION A-A
  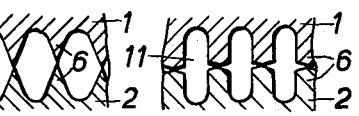
FIG.2  FIG.3  FIG.4  FIG.5
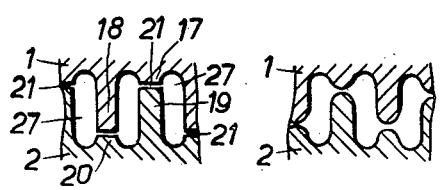 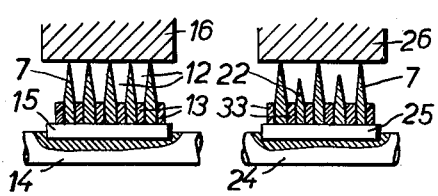
FIG.6  FIG.7  FIG.8  FIG.9
FIG.10
INVENTOR.
WERNER SIMON
BY Donald J. Haefele
ATTORNEY Nov. 21, 1961 W. SIMON 3,009,848
ELASTIC FOAM ARTICLE AND APPARATUS FOR MAKING SAME
Filed March 26, 1956 2 Sheets-Sheet 2
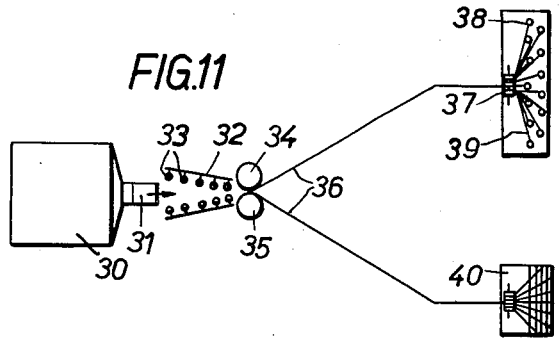
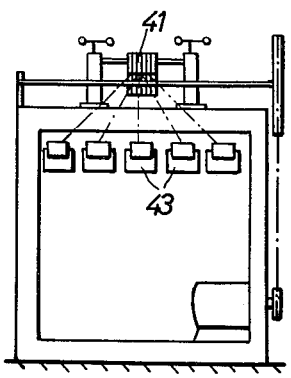
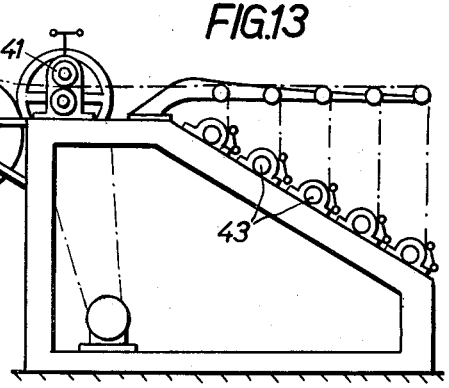
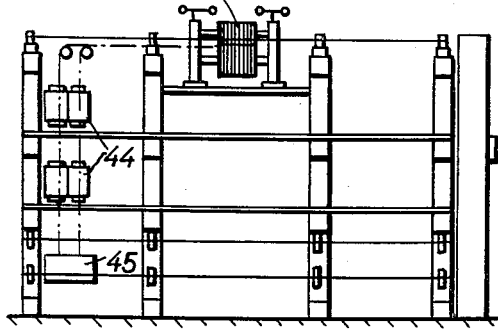
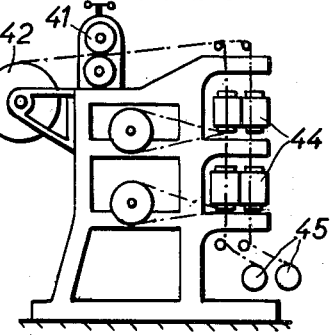
INVENTOR.
WERNER SIMON
BY
ATTORNEY

United States Patent Office 3,009,848
Patented Nov. 21, 1961

3,009,848
ELASTIC FOAM ARTICLE AND APPARATUS FOR MAKING SAME
Werner Simon, Wuppertal-Vohwinkel, Germany, assignor, by mesne assignments, to Ceolon-Gesellschaft K. E. Merckle
Filed Mar. 26, 1956, Ser. No. 573,769
Claims priority, application Germany Mar. 25, 1955
4 Claims. (Cl. 154—54)

The present invention relates to apparatus for producing sheets, foils, strips, ribbons, threads and the like from foamed plastics, such as rubber foam, vinyl foam and polyurethane foam. This invention also relates to a novel elastic foam article.

It has been proposed to produce sheets, foils, ribbons, threads and the like of elastic foam by cutting slabs of a foamed plastic with devices comprising a plurality of knives or hot wires mounted at regular distances from one another. Such a procedure, however, is time-consuming and not suitable for large scale production.

It is an object of the present invention to provide apparatus for making sheets, foils, ribbons, threads and the like from foamed plastics in a simple manner and on a large scale. Another object is to provide apparatus for producing sheets, foils, ribbons, threads and the like from foamed plastics in block form as they are obtained in commercial production. A further object is to provide a novel elastic article.

It has been found in accordance with the present invention that sheets, foils, strips, ribbons, threads and the like of elastic foam can easily be obtained by cutting a piece of elastic foam in the compressed state. A preferred embodiment of the invention involves apparatus comprising rotating grooved rollers which cut an elastic foam piece in the compressed condition. To produce strips, ribbons and threads in accordance with the invention, a piece of foam is passed between two grooved rollers revolving in opposite directions and being arranged in such manner that the cutters forming the groove walls of the first roller touch the cutters forming the groove walls of the second roller, said cutters compressing and at the same time cutting the foam into shaped articles having a cross sectional thickness corresponding to the width of the grooves in said rollers. If wide foils of any desired surface area are to be produced from foamed plastics, a piece of foam is continuously formed into a zigzag structure by passing it between two grooved rollers revolving in opposite directions and being arranged in such manner that the cutters forming the groove walls of the first cutter do not touch the cutters forming the groove walls of the second roller but revolve at a small distance from the latter, said cutters making incisions into the foam. The folded structure thus obtained is then unfolded, and if desired, subsequently heat-treated on the surface under pressure so that an element with a large flat surface, for example, the desired broad foil, is formed. If it is desired to produce filaments or threads suitable for making fabrics, the foamed block is cut into strips or ribbons and these structures are continuously cut into thin filaments or threads which are separately wound. In other words, the piece of foam is first cut into a plurality of vertical foils which, after being turned horizontally, are cut in a second step into threads by an arrangement of rotating grooved rollers quite identical with the first one. Broadly speaking, it is possible to cut a piece of foam into threads, filaments and the like step by step with an appropriate number of machines, the grooved rollers of which being adapted to the desired step. The thin filaments or threads thus obtained may be combined with conventional textile threads to improve their mechanical properties and they may be reeled in order to serve as starting material for weaving, knitting or other processes used in the textile industry.

In the apparatus of the invention, there may be used two grooved rollers, the groove walls of which act as cutting teeth, said rollers being mounted in a roller frame revolving in opposite directions. For blocks of foamed material which are particularly large, a compressing device may be set up in front of the grooved rollers, said compressing device comprising rotating rollers or cylinders which compress and at the same time move the foamed plastic to the grooved rollers by which the material is cut in the compressed state.

When making structures having defined profiles, such as strips, ribbons, threads, filaments and the like, the cutting teeth forming the groove walls of the first roller touch the cutting teeth forming the groove walls of the second roller so that the gripped block is cut at the areas of contact. When making broad foils, the grooved rollers are mounted in the roller frame at a distance from each other so that the cutters forming the groove walls of the first roller do not touch the cutters forming the groove walls of the second roller. This is preferably done by using rollers with alternating short and long cutters and arranging these rollers so that the short cutters on either roller are opposite the long cutters on the cooperating roller. By means of such an arrangement, a foil folded in zigzag formation is produced from the foamed block and this foil can be unfolded to form a wide foil.

Depending upon the shape of the cutters, a sharp-edged or wavy fold is produced. The groove walls may be formed by exchangeable knives fastened to the rollers with keys and separated from one another by exchangeable spacing rings. With a knife roller constructed in this manner, it may be preferred to use a cooperating roller having a smooth surface.

Embodiments of apparatus which can be used are shown diagrammatically and by way of example in the accompanying drawings. FIGURES 1 and 1a represent, respectively, a front elevation of two grooved rollers mounted in a roller frame and a transverse section taken on the line AA of FIGURE 1. FIGURES 2 to 9 illustrate various profiles of the grooved rollers, these figures being sections on the line AA of FIGURE 1. FIGURE 10 illustrates a zigzag structure produced by the roller system of FIGURE 7 after the structure has been unfolded. FIGURE 11 diagrammatically represents an apparatus for producing foils and threads from foamed plastics. FIGURE 12 is a front elevation and FIGURE 13 is a side elevation of a machine for the the production of threads from foils of foam made by the method of the invention, said machine being combined with a reeling device for the threads. FIGURE 14 is a front elevation and FIGURE 15 a side elevation of a machine for making filaments and threads from a ribbon of foam made in accordance with the invention, said machine being combined with a spiral covering machine for spinning other threads around the thread produced and a reeling machine for the covered filaments or thread.

Referring to the drawings in detail, numerals 1 and 2 in FIGURES 1 and 2 represent two grooved rollers arranged in a stand, said rollers being driven by the front wheels 3 and 4. The rollers are provided with the grooves 5 which may take any of the forms illustrated in FIGURES 2 to 9. The block of foamed material to be cut is received by the rollers 1 and 2 and drawn in the direction of the arrow (FIGURE 1), whereby it is compressed; by means of the cutters forming the groove walls, i.e. the cutting teeth 6 in FIGURES 2 to 5 or the cutting knives 7 in FIGURES 8 and 9, the compressed block is cut into elongated structures, for example, cords, strips, foils or threads, having a cross sectional thickness corresponding to the grooving 8, 9, 10, 11 or 12 of the rollers. FIGURE 8 shows a roller, the grooved profile of which is formed by cutting knives 7 and spacing rings 13, said cutting knives being attached to the shaft 14 with the keys 15. The cooperating roller 16 has a smooth surface or, if desired, also a grooved profile. The distance at which the single cutters are arranged can be adapted to any desired width of the foil or thread to be produced. It is, of course, possible to employ grooved rollers having their cutters arranged at varying distances. By this way, foils with different dimensions can be obtained in one single operation.

The dimensions of the cutters are dependent on the thickness of the piece of foam to be cut. To give an example, a cutter extending 0.75 mm. from the roller surface (the two opposite cutters forming a roller interspace of 1.5 mm.) will allow cutting a piece of 25-30 mm. in thickness. In order to cut a piece with a thickness of 1 m., cutters each having a height of 15 cm. should be provided. The diameter of the roller itself should be chosen, so that sufficient compression of the piece of foam is obtained. For instance, a piece of 1 m. in thickness will normally require a roller with a diameter of 40-50 cm.

The rollers shown in FIGURES 2 to 5 are arranged in such manner that their cutters 6 touch. At the area of contact, the compressed foam is cut so that structures having defined profiles, such as strips, ribbons and threads result. The grooved rollers represented in FIGURES 6 and 7 will produce foils having a large surface. In FIGURE 6, the short cutters 17 alternate with the long cutters 18 on roller 1. The opposite roller 2 is so arranged that its long cutters 19 are opposite the short cutters 17 of roller 1 while its short cutters 20 are opposite the long cutters 18 of roller 1, the distance between the rollers being shown by numeral 21. In FIGURE 6, the cutters are sharp-edged while in FIGURE 7, they are rounded off. According to FIGURE 9, the long cutting knives 7 alternate with the short cutting knives 22. The spacing of the knives is determined by the rings 23 which are fastened with the knives on a shaft 24 by means of key 25. The opposite roller 26 has a smooth surface. Since the cutters 17 and 19 and also 18 and 20 in FIGURES 6 and 7 do not contact each other but rotate at the distance 21, the block of foam gripped and compressed by the rollers is not cut into separate strips or threads, but the strips formed remain interconnected to one another by the material remaining in the interstice 21 so that a structure folded in zigzag formation is obtained. When this structure is unfolded, it assumes the shape shown in FIGURE 10, in which those parts of the foil which are formed in the grooves 27 are indicated by numeral 28 while those parts formed in the interstice 21 are indicated at 29. In this manner, a block having a breadth of 1 meter and a height of 30 centimeters can, for example, be converted into a folded structure which when unfolded, forms a foil having a thickness of 1 millimeter and a width of about 295 meters.

FIGURE 11 is a diagrammatic view of a machine for producing spirally covered threads of foamed plastic, i.e., threads around which a thread of another material is spun, and winding up the threads on a reeling device. Reference character 30 represents a foam machine producing the foamed block 31. This block is progressively compressed by a compressing arrangement 32 which contains a plurality of driven rollers 33. The compressed foam is at the same time moved to the grooved rollers 34 and 35 (in the direction of the arrow) where the foam is cut into the strips 36. These strips travel to the grooved rollers 37 where they are cut into the thin threads 38. Each thread 38 is covered on machines 39 and then reeled. Alternatively, the strips 36 leaving the grooved rollers 34 and 35 can be conducted to the filament producing machine 40 where each filament cut from the strip is reeled.

FIGURES 12 and 13 show a roller stand 41 on which a strip produced by the apparatus of the invention and reeled on to the spool 42 is cut into threads. Each of the threads produced is wound on to the spool 43.

FIGURES 14 and 15 show a roller stand 41 and a spool 42 holding a ribbon produced by the apparatus of the invention. Numeral 44 diagrammatically represents a covering device while numeral 45 is a diagrammatic view of a reeling device.

The apparatus of the invention is operatable with all kinds of elastic foam, such as elastic polyurethane foam, vinyl foam and rubber foam, no matter whether the foam has open or closed pores. Also the width of pores will not affect the process of the invention. The width of pores, however, should be held within small dimensions, so that a piece with a smooth surface can result. The elastic foam subjected to the apparatus of the invention may be in any suitable form. Thus, blocks of polyurethane foam obtainable in known manner from foamable mixtures comprising a polymeric hydroxyl compound, such as an hydroxyl polyester, a polyisocyanate and an activator mixture containing a tertiary amine, a surface active agent and a small amount of water, may serve as the starting material for the process of the invention.

The invention is further illustrated by the following example without being restricted thereto:

*Example*

A block of an elastic polyurethane foam with the dimensions of 50 m. x 1 m. x 0.3 m. is passed between two grooved rollers revolving in opposite direction. The rollers have a diameter of 120 cm. and their cutting teeth a length of 7.5 cm. The interstice between two teeth amounts to 5 mm. The block is passed through this arrangement at a rate of 60 m. per minute, whereby it is cut into foils being 50 m. long, .3 m. wide and 5 mm. thick. These foils are then turned horizontally and passed once more through an arrangement of grooved rollers quite identical with the aforementioned rollers. By this procedure, threads of 50 m. in length with a cross section of 5 x 5 mm. are produced.

What is claimed is:

1. Apparatus for cutting a block of elastic cellular foam material which comprises two grooved rollers positioned for revolving in opposite directions, said rollers each having alternating long and short cutters, said rollers being arranged in such manner that the long cutters of each roller are opposite the short cutters of the other roller, and the cutters forming the groove walls of the first roller do not touch the cutters forming the groove walls of the second roller, but revolve at a small distance from the latter.

2. As a new article of manufacture, an accordion plait-like elastic cellular foam structure, comprising a single block of plastic foam said block having two series of parallel slits each of which slits extends throughout the length of the block, the slits of one series being interpositioned midway of the slits of the other series, the slits of one series penetrating the block from one face nearly to but not through the opposite face and the slits of the other series penetrating the block from the opposite face nearly to but not through the first face to form interconnected slabs, which when unfolded forms a foil having a width of many times the width of said single block of foam.

3. As a new article of manufacture, a block of plastic foam said block having two series of parallel slits each of which slits extends throughout the length of the block with the slits of one series being interpositioned within the slits of the other series, the slits of one series penetrating the block from one face nearly to but not through the opposite face, and the slits of the other series penetrating the block from the opposite face nearly to but not through the first face to form interconnected slabs, and wherein the areas between said slits are equal in width to the width of the unslitted areas from the end of each slit to the said opposite face.

4. Apparatus for cutting a block of elastic cellular foam material comprising a pair of rollers each having secured thereto a plurality of annular cutters extending perpendicular to the axis of the roller and being spaced from each other along the surface of each roller, means to mount said rollers for rotation in opposite directions wherein the said annular cutters of one roller are interposed in the spaces between the cutters of the other roller and wherein the outer peripheral surface of the cutters on each roller are spaced from the peripheral surface of the opposite roller.

References Cited in the file of this patent

UNITED STATES PATENTS

| | | |
|---|---|---|
| 549,027 | Scott | Oct. 29, 1895 |
| 1,183,301 | Kavauagh | May 16, 1916 |
| 1,525,590 | Perrault | Feb. 10, 1925 |
| 1,539,052 | McCrohan et al. | May 26, 1925 |
| 1,617,511 | Balch | Feb. 15, 1927 |
| 1,628,836 | Gammeter | May 17, 1927 |
| 1,954,635 | Leonard | Apr. 10, 1934 |
| 1,988,787 | Fowler | Jan. 22, 1935 |
| 2,297,622 | Herman | Sept. 29, 1942 |
| 2,325,903 | Blair et al. | Aug. 3, 1943 |
| 2,363,051 | Dosmann | Nov. 21, 1944 |
| 2,384,387 | Meyer | Sept. 4, 1945 |
| 2,582,294 | Stober | Jan. 15, 1952 |
| 2,728,950 | Annesser | Jan. 3, 1956 |
| 2,740,739 | Harwin et al. | Apr. 3, 1956 |
| 2,757,147 | Pooley | July 31, 1956 |
| 2,770,241 | Winkle | Nov. 13, 1956 |
| 2,848,427 | Lubens | Aug. 19, 1958 |

FOREIGN PATENTS

| | | |
|---|---|---|
| 805,494 | France | Aug. 22, 1936 |

OTHER REFERENCES

Goggin et al.: Foamed Plastics, "British Plastics," vol. 19, No. 222, December 1947, page 531.